United States Patent
Evelyn

(10) Patent No.: US 9,347,184 B2
(45) Date of Patent: May 24, 2016

(54) TEMPORARY ROAD MAT WITH MEMBRANE

(71) Applicant: Charles City Timber and Mat, Inc., Providence Forge, VA (US)

(72) Inventor: Patrick Evelyn, New Kent, VA (US)

(73) Assignee: Charles City Timber and Mat, Inc., Providence Forge, VA (US)

( * ) Notice: Subject to any disclaimer, the term of this patent is extended or adjusted under 35 U.S.C. 154(b) by 0 days.

(21) Appl. No.: 14/684,354

(22) Filed: Apr. 11, 2015

(65) Prior Publication Data
US 2015/0308054 A1    Oct. 29, 2015

Related U.S. Application Data

(60) Provisional application No. 61/978,426, filed on Apr. 11, 2014.

(51) Int. Cl.
| | |
|---|---|
| *E01C 5/00* | (2006.01) |
| *E01C 11/24* | (2006.01) |
| *E01C 9/08* | (2006.01) |
| *E01C 5/22* | (2006.01) |
| *E01C 11/22* | (2006.01) |

(52) U.S. Cl.
CPC . *E01C 11/24* (2013.01); *E01C 5/22* (2013.01); *E01C 9/086* (2013.01); *E01C 11/225* (2013.01)

(58) Field of Classification Search
CPC .......... E01C 9/08; E01C 9/086; E01C 11/16; E01C 11/24; E01C 2201/16; E01C 2201/20
USPC .................. 404/34–36, 46, 73, 75
See application file for complete search history.

(56) References Cited

U.S. PATENT DOCUMENTS

| | | | | |
|---|---|---|---|---|
| 4,277,201 | A * | 7/1981 | Abell | E01C 19/522 404/35 |
| 4,462,712 | A * | 7/1984 | Penland, Sr. | E01C 9/086 404/36 |
| 5,032,037 | A * | 7/1991 | Phillips | E01C 9/086 404/35 |
| 5,087,149 | A * | 2/1992 | Waller, Jr. | E01C 9/086 404/35 |
| 5,273,373 | A * | 12/1993 | Pouyer | E01C 9/086 404/35 |
| 8,066,447 | B2 * | 11/2011 | Brandstrom | B27M 3/008 144/353 |
| 8,662,787 | B2 * | 3/2014 | Sawyer | E01C 3/006 404/18 |
| 2005/0025582 | A1 * | 2/2005 | Ianniello | E02B 11/005 405/302.4 |

* cited by examiner

*Primary Examiner* — Raymond W Addie
(74) *Attorney, Agent, or Firm* — Von Rohrscheidt Patents

(57) ABSTRACT

A temporary road mat configured as a timber mat including one or two layers of longitudinally oriented elongated timbers arranged in parallel at even intervals; one layer of transversally oriented elongated timbers arranged in parallel at even intervals and perpendicular to the longitudinally oriented elongated timbers; at least one membrane extending over an entire main surface of the timber mat, wherein the timbers are drilled and bolted together at intersections.

14 Claims, 4 Drawing Sheets

TEMPORARY ROAD MAT WITH MEMBRANE

RELATED APPLICATIONS

This application claims priority from and incorporates by reference Provisional Patent Application 61/978,426 entitled Temporary Road Mat with Membrane filed on Apr. 11, 2014.

FIELD OF THE INVENTION

The present invention relates to a temporary road mat with a membrane.

BACKGROUND OF THE INVENTION

Temporary road mats are used extensively to allow vehicles and equipment to reach locations not served by permanent roads, particularly under conditions where ground surfaces would not support the traffic or where the temporary nature of use does not warrant the time and expense of a permanent road. The temporary road mats are typically configured as timber mats constructed from multiple layers of heavy wood timbers in crisscrossing layers.

On muddy soil the timber mats typically sink into the soil when a heavy vehicle drives over them which compresses the soil and squeezes water and out of it that flows upward through the timber mat and accumulates within the timber mat and on top of the timber mat. This pumping effect can cause considerable water and mud accumulation within the timber mat and on top of the timber mat which reduces traction of the vehicles and can also lead to faster degradation of the timber mats.

BRIEF SUMMARY OF THE INVENTION

It is the object of the invention to provide a timber mat that is combined with a membrane to prevent or reduce water and mud flow through the timber mat in upward direction while allowing water to drain from above through the timber mat in downward direction.

The object is achieved by a timber mat including plural layers of mutually perpendicular elongated timbers including an array of intersections including longitudinally spaced lateral rows and a membrane advantageously configured from a geo fabric.

The object is also achieved by a method for using timber mats, wherein the geo fabric is placed on the ground as a base for the non-permanent road to be built and the timber mats are arranged one adjacent to the other on the geo fabric.

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1:
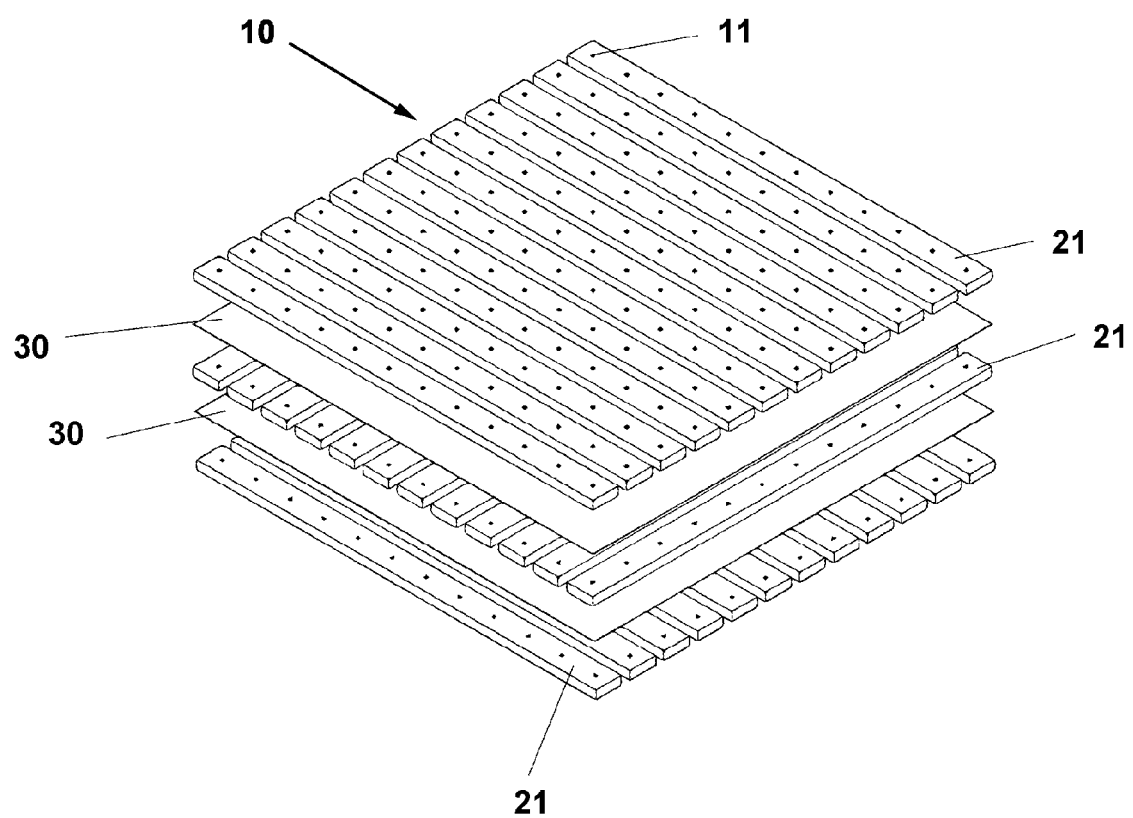
FIG. 1 illustrates an exploded perspective top view of the timber mat according to the invention.
Figure 2:
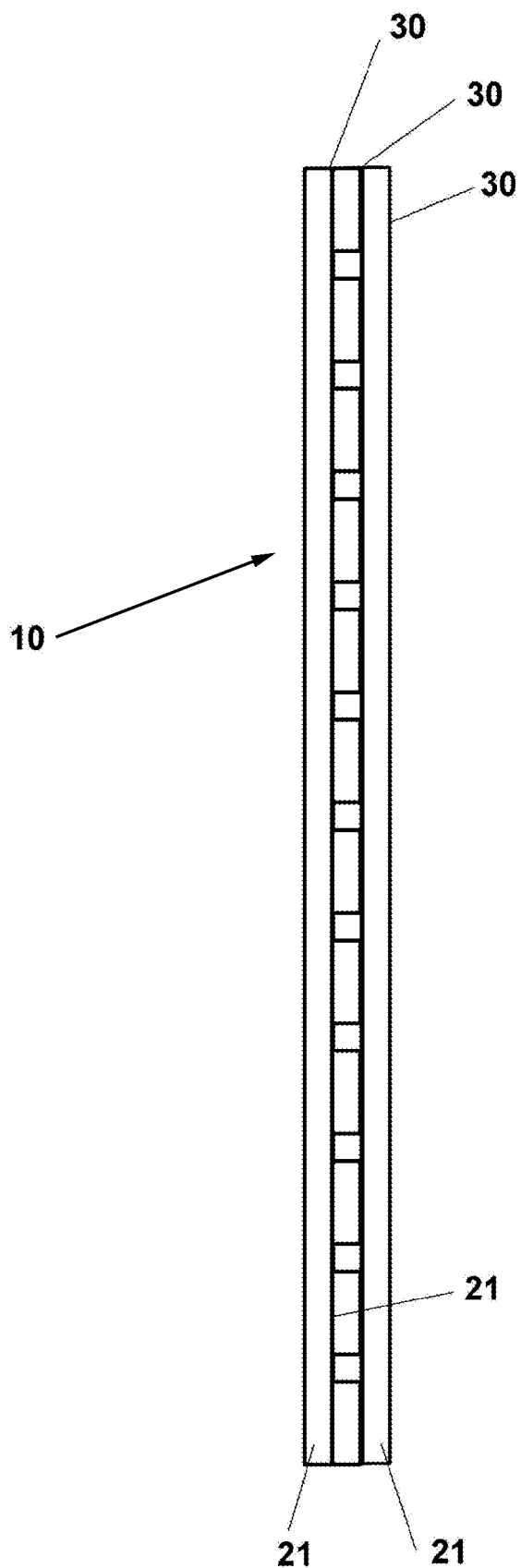
FIG. 2 illustrates a side view of the timber mat according to the invention.
Figure 3:
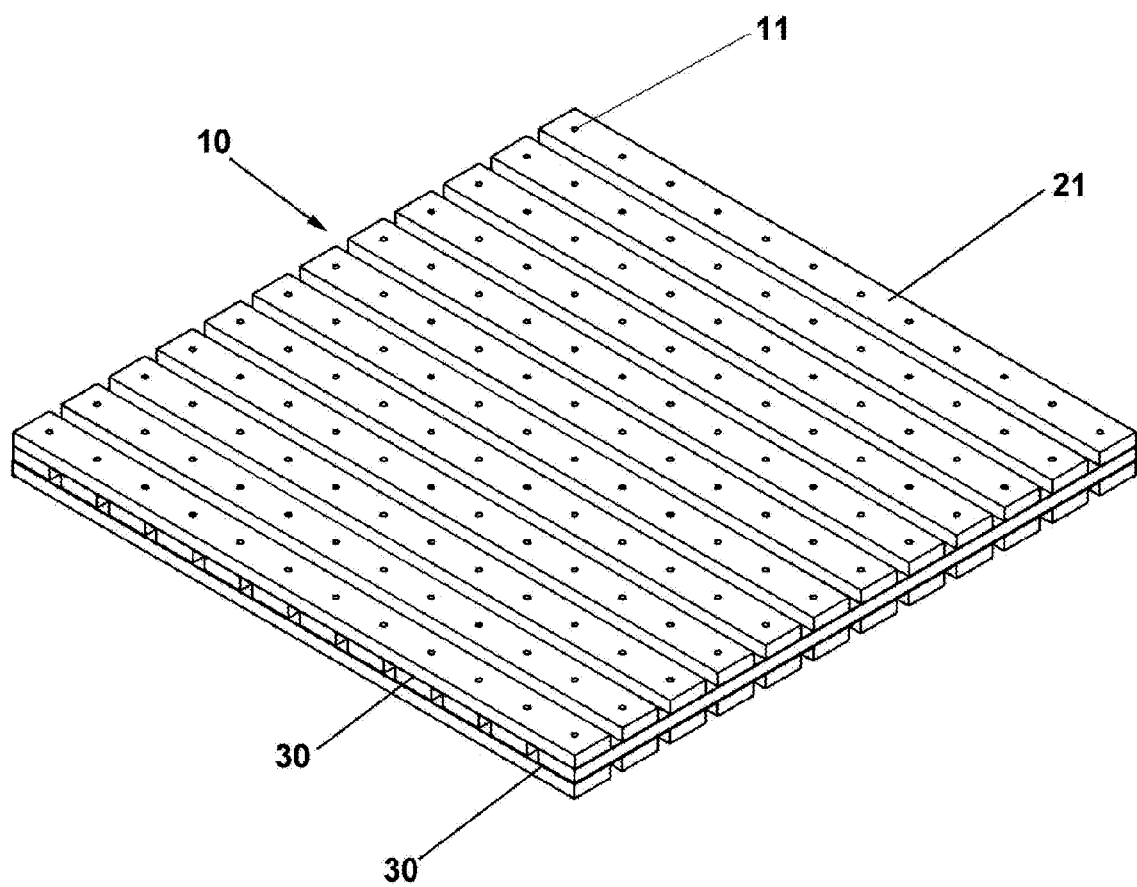
FIG. 3 illustrates a perspective top view of the timber mat according to the invention.
Figure 4:
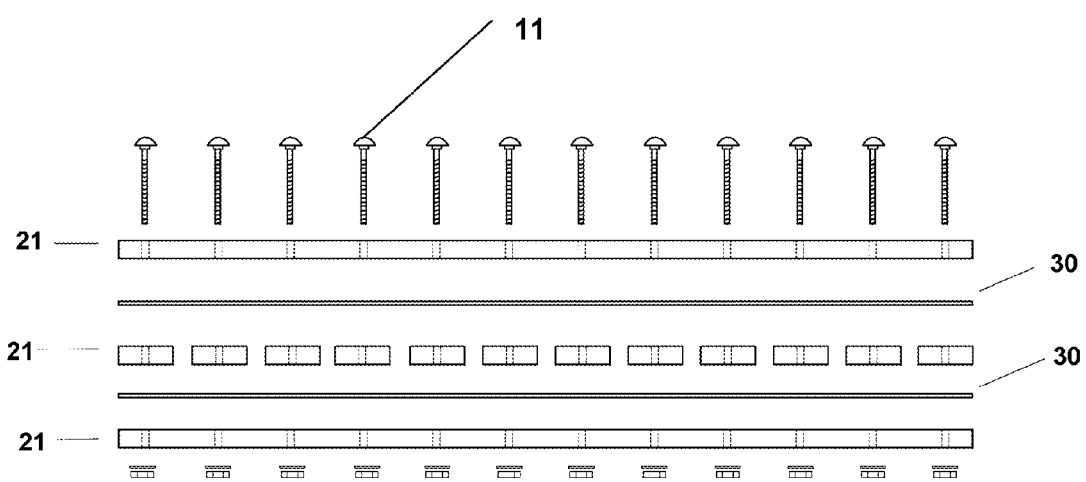
FIG. 4 illustrates an exploded side view of the timber mat according to the invention.

The timber mats 10 include two, three or more layers of timbers 21 (the timbers could also be called planks). The timbers are arranged parallel to each another and laterally offset from one another at uniform intervals in each layer. Timbers in adjacent layers are oriented perpendicular to one another. The timbers are typically made from oak and typically 2 inches thick, 8 inches wide and 8-20 feet long. The timber mats typically have a size of 8 feet×14 feet. The timber mats are typically 11 timbers wide. The timbers are drilled intersections and bolted together with bolts 11 that typically have ⅜" diameter and are secured with nuts washers and nuts at their distal ends. A timber mat is typically 6 inches thick. Instead of oak, other types of wood, combinations of wood or wood composites may be used. Additionally, other non-timber materials may be used as the timbers 21 including but not limited to plastics or non-wood composites.

A membrane 30 can be mounted between the layers of timbers and also at a bottom of the timber mat. When the membrane 30 is mounted between the layers of timbers it is drilled together with the timber mat and does not need any additional fixation after the bolts 11 are tightened. The membrane is well protected when installed between the layers of timbers. When placed on a bottom of the timber mat the membrane is advantageously attached with staples. The membrane attached to the bottom of the timber mat can also be attached with staples at all lateral surfaces of the timber mat so that it envelops the timber mat at its bottom and at its four side surfaces like a tub.

The purpose of the membrane is to let rainwater drain through from above while either preventing groundwater and mud from seeping up through the membrane or greatly slowing down the water movement in upward direction. The retardation of the upward water and mud flow reduces a pumping effect that occurs when vehicles drive over the timber mat placed on wet soil. Water and mud cannot move upward through the timber mat quickly. When two membranes are used in a three layer timber mat above and below the center timber layer they define a cavity that increases the flotation of the timber mat on muddy ground.

The membrane 30 can advantageously made from geotextiles like Dupont SF 32, GTF200, GTF200S, 140EX. These geotextiles have excellent grab tensile strength and tear resistance. Geotextiles are durable and easy to handle for fast and efficient installations. They have been used so far for paved and unpaved roads, parking lots and airports taxiways, but not for temporary roads built from timber mats.

The membrane 30 can advantageously have a water permeability in a first direction (typically upward) perpendicular to its surface that differs from a water permeability in a second direction perpendicular to its surface. For example, the water permeability in the first direction can be zero and the water permeability in the second direction differs can be something other than zero. Alternatively, the water permeability in the first direction can be ten times the water permeability in the second direction.

Temporary road surfaces may be created by placing a geo fabric on a road path, and placing the inventive mats adjacent to one another onto the geo fabric, The geo fabric has a length that is greater or equal to a width of the geo fabric.

In another advantageous embodiment of the invention the membrane is placed on the ground before the timber mats are deployed. The membrane stabilizes the ground, let s rainwater drain through from above and greatly retards a flow of water and mud through the timber mat from below.

What is claimed is:

1. A temporary road mat configured as an individual timber mat, comprising:
   one or two layers of longitudinally oriented elongated timbers arranged in parallel at even intervals;

one layer of transversely oriented elongated timbers arranged in parallel at even intervals and perpendicular to the longitudinally oriented elongated timbers; and at least one individual membrane extending over an entire main surface of the individual timber mat and limited in size to an extension of the entire main surface of the individual timber mat, wherein the timbers are drilled and bolted together at intersections, and wherein the at least one individual membrane is attached to the individual timber mat.

2. The timber mat according to claim 1, wherein the at least one membrane is made from a geo fabric.

3. A temporary road mat configured as a timber mat, comprising:

one or two layers of longitudinally oriented elongated timbers arranged parallel at even intervals;

one layer of transversely oriented elongated timbers arranged in parallel at even intervals and perpendicular to the longitudinally oriented elongated timbers; and at least one membrane extending over an entire main surface of the timber mat, wherein the timbers are drilled and bolted together at intersections, and wherein the at least one membrane is arranged between the one or two layers of longitudinally oriented elongated timbers and the layer of transversely oriented elongated timbers.

4. A method for producing a temporary road surface, comprising the steps:

placing a geo fabric on a road path; and placing timber mats according to claim 3 adjacent to one another onto the geo fabric, wherein the geo fabric has a length that is greater than or equal to a width of the geo fabric.

5. A temporary road mat configured as a timber mat, comprising:

one or two layers of longitudinally oriented elongated timbers arranged in parallel at even intervals;

one layer of transversely oriented elongated timbers arranged in parallel at even intervals and perpendicular to the longitudinally oriented elongated timbers; and at least one membrane extending over an entire main surface of the timber mat, wherein the timbers are drilled and bolted together at intersections, and wherein the membrane has a water permeability in a first direction perpendicular to its surface that differs from a water permeability in a second direction perpendicular to its surface.

6. The timber mat according to claim 5, wherein the water permeability in the first direction is zero and the water permeability in the second direction differs from zero.

7. The timber mat according to claim 5, wherein the water permeability in the first direction is ten times the water permeability in the second direction.

8. The timber mat according to claim 5, wherein the first direction is upward and the second direction is downward.

9. A timber mat, comprising:

longitudinally oriented elongated timbers arranged in parallel at intervals;

transversely oriented elongated timbers arranged in parallel at intervals and perpendicular to the longitudinally oriented elongated timbers; and at least one membrane extending over an entire main surface of the timber mat, wherein the timbers are connected together at intersections, and wherein the membrane has a water permeability in a first direction perpendicular to its surface that differs from a water permeability in a second direction perpendicular to its surface.

10. A temporary road mat comprising:

at least one layer of longitudinally oriented elongated planks arranged in parallel at intervals;

at least one layer of transversely oriented elongated planks arranged in parallel at intervals and perpendicular to the longitudinally oriented elongated planks; and at least one membrane extending over an entire main surface of the mat, wherein the planks are connected together at intersections, and wherein the membrane has a water permeability in a first direction perpendicular to its surface that differs from a water permeability in a second direction perpendicular to its surface.

11. The temporary road mat according to claim 10, wherein the at least one membrane is made from a geo fabric.

12. The temporary road mat according to claim 10, wherein the water permeability in the first direction is zero and the water permeability in the second direction differs from zero.

13. The temporary road mat according to claim 10, wherein the water permeability in the first direction is ten times the water permeability in the second direction.

14. The temporary road mat according to claim 10, wherein the first direction is upward and the second direction is downward.

* * * * *